UNITED STATES PATENT OFFICE.

AMBROSE J. GUIDRY, OF NEW ORLEANS, LOUISIANA, ASSIGNOR OF ONE-THIRD TO JULIUS MAY AND ONE-THIRD TO CHARLES LANDRY, BOTH OF NEW ORLEANS, LOUISIANA.

RESILIENT COMPOSITION.

1,117,839.     Specification of Letters Patent.     Patented Nov. 17, 1914.

No Drawing.     Application filed August 21, 1913. Serial No. 785,936.

*To all whom it may concern:*

Be it known that I, AMBROSE J. GUIDRY, a citizen of the United States, residing at New Orleans, in the parish of Orleans and State of Louisiana, have invented certain new and useful Improvements in Resilient Compositions; and I do declare the following to be a full, clear, and exact description of the invention, such as will enable others skilled in the art to which it appertains to make and use the same.

This invention relates to an improved resilient compound designed as a rubber substitute being especially adapted for use in constructing vehicle tires.

The object of the invention is to provide a compound of this character which is very cheap to manufacture, is tough, infusible, insoluble and equally resilient as a pneumatic tire and which will not flatten out or run and will resume its shape when relieved from pressure.

This compound is composed of the following ingredients combined in the proportions set forth below, to wit:

| Ingredient | Amount |
|---|---|
| Glue | 25.6% |
| Water | 25.6 |
| Glycerin | 25.6 |
| Litharge | .6 |
| Rubber in turpentine | 4.8 |
| Venice turpentine | .6 |
| Potassium chromate | 1.2 |
| Carbon | 1.2 |
| Asbestos | 4.8 |
| Acetic acid | 1.6 |
| Cotton seed oil | 1.2 |
| Pipe clay | 7.2 |

In forming this composition the glue, glycerin and water are prepared and combined by placing them in a water bath and applying heat thereto until the water boils when these ingredients will form a smooth mass. Next the cotton seed oil and litharge are placed in a vessel with a small quantity of water and said vessel placed over a slow fire, the heat being gradually raised until the oil and litharge form a homogeneous mass of rubber like consistency. The pure rubber is then dissolved in the oil of turpentine and the smooth liquid mass formed by the glue and water, the rubber like mass produced by the cotton seed oil and litharge as described above and the pure rubber dissolved in oil of turpentine are then placed upon a water bath and stirred until perfectly mixed. The acetic acid, asbestos and carbon are then added to the mixture and then the potassium chromate which has previously been incorporated with the Venice turpentine, is added and finally the pipe clay is added, the mass being agitated until all of the ingredients are thoroughly commingled. The composition being now completed the tire or molds are filled by air pressure, the degree of resiliency being controlled by the amount of pressure used. After the mixture or composition has been molded it is placed in an oven and subjected to heat for four or five hours at a temperature not exceeding 120° C. when the tires or other articles into which the composition has been formed will be ready for use. The degree of resiliency may be graded according to the weight of the car or the load to be carried by the vehicle to which the tires are applied and these tires so produced will have all of the advantages of the pneumatic tire and none of its disadvantages.

I claim as my invention:

1. A resilient compound the initial ingredients of which consist of 25.6% glue, 25.6 water, 25.6 glycerin, .6 litharge, 4.8 rubber in turpentine, .6 Venice turpentine, 1.2 potassium chromate, 1.2 carbon, 4.8 asbestos, 1.6 acetic acid, 1.2 cotton seed oil and 7.2 pipe clay.

2. A process of forming a resilient compound which consists in first combining glue, glycerin and water in a heated water bath until a smooth mass is produced; then combining cotton seed oil and litharge with a small quantity of water by applying heat thereto and gradually raising the temperature until the oil and litharge form a homogeneous mass of rubber like consistency; then dissolving pure rubber in oil of turpentine; then commingling the three compounds above described by placing them on a water bath and stirring until perfectly mixed; then adding to the mixture acetic acid, asbestos, carbon, potassium chromate incorporated with the Venice turpentine, and then adding pipe clay to the mixture; then molding the mixture into the desired shapes and finally baking it.

3. A process of forming a resilient compound which consists in first combining glue, glycerin and water in a heated water bath until a smooth mass is produced; then combining cotton seed oil and litharge with a small quantity of water by applying heat thereto and gradually raising the temperature until the oil and litharge form a homogeneous mass of rubber like consistency; then dissolving pure rubber in oil of turpentine; then commingling the three compounds above described by placing them in a water bath and stirring until perfectly mixed; then adding to the mixture acetic acid, asbestos, carbon, potassium chromate incorporated with the Venice turpentine, and then adding pipe clay to the mixture; then molding the mixture into the desired shapes and finally baking it for four or five hours at a temperature not exceeding 120° C.

In testimony whereof I have hereunto set my hand in presence of two subscribing witnesses.

AMBROSE J. GUIDRY.

Witnesses:
EUGENE LIVIQUE,
L. A. GUIDRY.